US006552891B1

(12) United States Patent
Prach

(10) Patent No.: US 6,552,891 B1
(45) Date of Patent: Apr. 22, 2003

(54) PORTABLE HANDHELD WORK APPARATUS

(75) Inventor: Klaus Prach, Weinstadt (DE)

(73) Assignee: Andreas Stilhl AG & Co., Waiblingen (DE)

( * ) Notice: Subject to any disclaimer, the term of this patent is extended or adjusted under 35 U.S.C. 154(b) by 158 days.

(21) Appl. No.: 09/644,048

(22) Filed: Aug. 23, 2000

(30) Foreign Application Priority Data

Aug. 23, 1999 (DE) .................................... 299 14 687 U

(51) Int. Cl.[7] ............................................... H01G 50/12
(52) U.S. Cl. ....................................... 361/212; 361/220
(58) Field of Search ................................ 361/212, 220

(56) References Cited

U.S. PATENT DOCUMENTS 1,920,889 A * 8/1933 Pullen ........................ 175/264
4,197,610 A * 4/1980 Schneider .................... 15/383
4,342,369 A * 8/1982 Ransom .................... 180/19 H
4,644,606 A * 2/1987 Luerken et al. ............... 15/330
4,697,300 A * 10/1987 Warlop ..................... 15/327 R
4,715,085 A * 12/1987 Johanson ..................... 15/339
4,748,712 A * 6/1988 DiGioivanni ................ 15/327

* cited by examiner

*Primary Examiner*—Brian Sircus
*Assistant Examiner*—Zeev Kitov
(74) *Attorney, Agent, or Firm*—Walter Ottesen

(57) ABSTRACT

The invention relates to a portable handheld work apparatus which is driven by a drive motor (1) having electrical ground (4). The drive motor (1) is configured especially as a spark-ignition engine (2). The work apparatus includes handles (5, 33) of electrically insulating material. A grounding element (6) is provided in the surface of the handle and this grounding element is conductively connected to the electrical ground (4) of the motor (1).

81 Claims, 4 Drawing Sheets

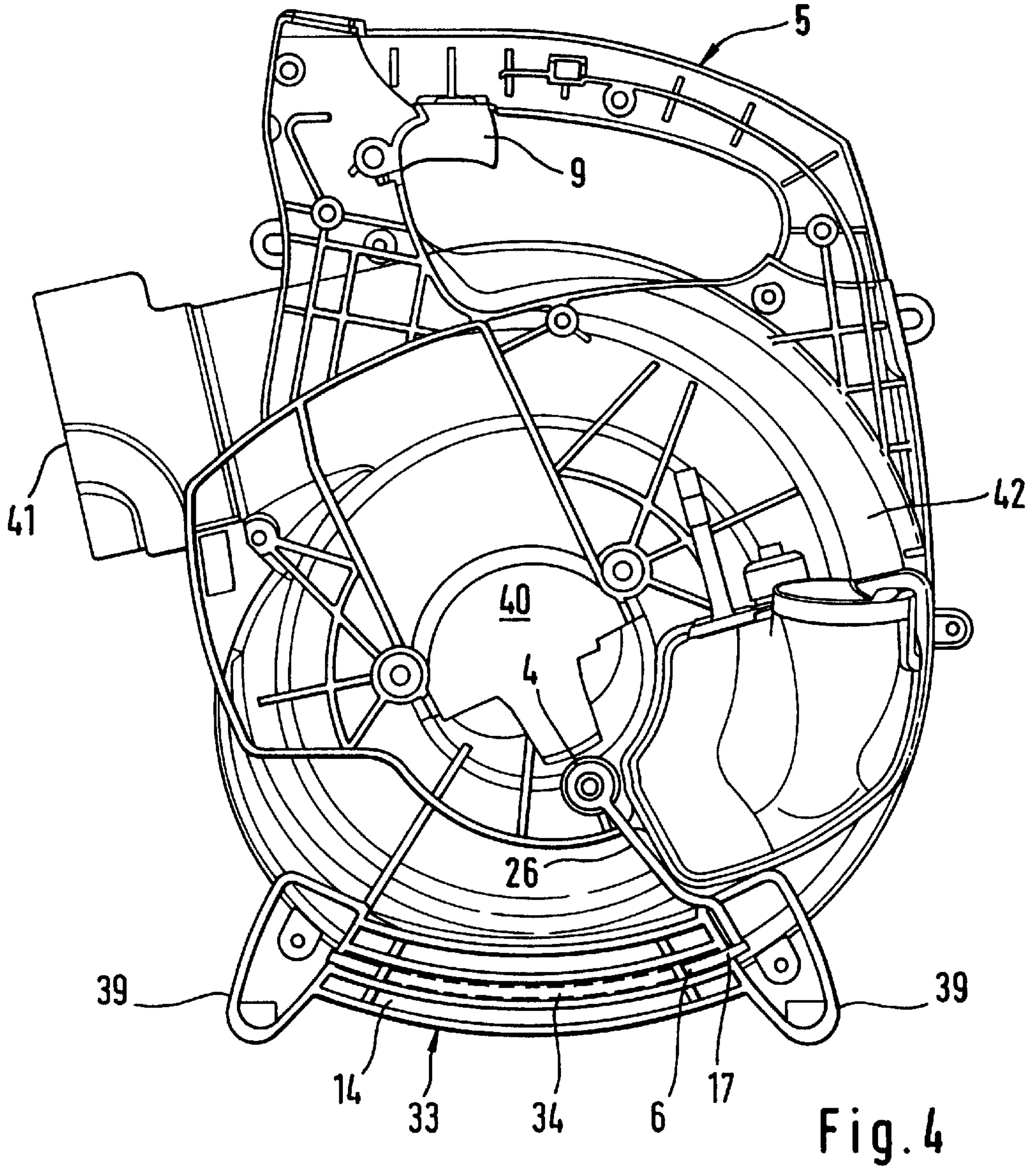
Fig.4
Fig.5
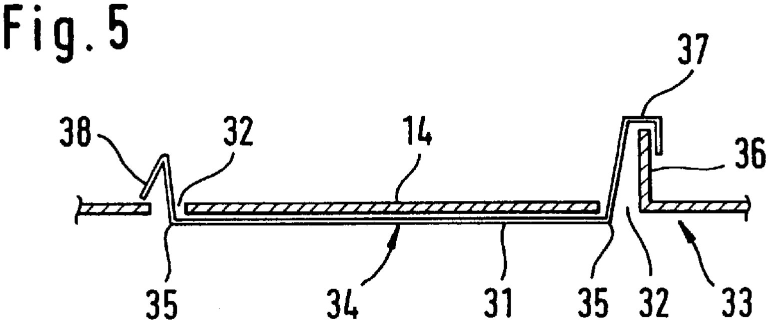

PORTABLE HANDHELD WORK APPARATUS

FIELD OF THE INVENTION

The invention relates to a portable handheld work apparatus having a drive motor with an electrical ground and with a handle made of electrically-insulating material. The drive motor can, for example, be configured as a spark-ignited internal combustion engine.

BACKGROUND OF THE INVENTION

A work apparatus of the above kind such as a suction/blower apparatus can become electrostatically charged during the operation thereof in the area of its electrically insulating components. The electric charge is generated especially in suction/blower apparatus operated in the suction mode because of the movement of the particles entrained in the suction flow. Because of the use of plastic housings, the handles thereof are insulated from the electrical ground of the drive motor. Electrostatic charges occurring in the region of the handles are conducted to earth via the operator and this can affect the comfort of the use of suction/blower apparatus.

SUMMARY OF THE INVENTION

It is an object of the invention to effectively prevent an electrostatic charging of the handle of a work apparatus of the kind referred to above.

The portable handheld work apparatus includes: a drive motor having an electric ground; a handle operatively connected to the drive motor; the handle being made of electrically insulating material and having a surface; a grounding element mounted in the surface; and, means for electrically connecting the grounding element to the electric ground.

The invention is based on the idea to conductively connect the hand of the operator, which grasps the handle, to the electrical ground of the drive motor of the work apparatus. In this way, a negative effect on the well-being of the operator because of the electrostatic charge on the handle is prevented. For this purpose, a grounding element is mounted on the surface of the handle and this grounding element is conductively connected to the electrical ground. The grounding element is contacted by the hand of the operator when grasping the handle. In this way, an electrical connection of the hand to the electric ground is established and it is ensured that the electrostatic charge is conducted away.

Conventionally, at least one actuating element for controlling the drive motor is arranged on a first handle of the work apparatus. The actuating element is operatively connected to the motor by means of a transmission member. Suction/blower apparatus typically have a cylindrically-shaped housing having an intake opening on the end thereof. On the peripheral end of the housing, a second handle is mounted on the end thereof lying opposite to the first handle having the actuating element. During suction operation, the work apparatus can be so held at both handles that the intake opening faces in the direction of the surface to be vacuumed.

In a preferred embodiment, the grounding element is provided on the second handle where it can be connected to the electrical ground in a simple manner especially via a ground lead. Preferably, the grounding element is connected to the electric ground of the work apparatus. The grounding element can be purposefully mounted in the first handle and be conductively joined to the electrical ground via a transmitting element. The transmitting element leads out from the region of the handle to the motor. For this reason, the transmitting element can be used as an electrical line so that a separate electrical cabling between the grounding element and the electrical ground of the motor is unnecessary.

If the engine is a spark-ignited internal combustion engine having an ignition device and a throttle flap for controlling the engine power, then the engine block and the components mounted thereto, such as a carburetor, define the electrical ground. The actuating element, which is mounted on the handle, can be a throttle lever which is operatively connected to the throttle flap via a transmitting element in the form of a bowden cable for the purpose of controlling the throttle flap and therefore for influencing the power of the engine. Preferably, the bowden cable core is configured as an electrically conductive wire which is conductively connected to the electrical ground of the engine via the throttle flap shaft. The electrically conductive connection between the grounding element and the electrical ground is established with a configuration of this kind via the conductive wire. Even when the carburetor is connected to the engine via a rubber-elastic intermediate piece for the purpose of vibration damping, an electrically-conductive connection is present between the throttle flap shaft and the engine housing via the air/fuel mixture flow. This is sufficient in order to guarantee a potential compensation between the carburetor housing and the engine block.

If an actuating element in the form of an ignition switch is mounted in the handle, the ground cable thereof can be used as a transmitting element to the electrical ground of the engine. The ignition is short circuited to electrical ground of the engine via the ignition switch and the ground cable and the engine is thereby switched off. Because of the spatial closeness between the grounding element and the actuating elements (bowden cable, ignition switch), only a slight distance must be electrically bridged so that the constructive complexity is small.

According to another embodiment of the invention, the grounding element is configured as an elongated metal rail and especially as a sheet metal strip which is held with two bent-over portions at respective ends thereof in corresponding openings of the handle whereby a simple assembly is made possible.

Preferably, the grounding element is configured as a grounding wire and provided between the half shells on the end of the handle facing toward the motor housing. The half shells are joined together to form the handle.

The configuration of the grounding element as a sheet metal strip or as a grounding wire makes possible a cost-effective manufacture. The clamping arrangement of the sheet metal strip between the half shells makes possible a simple assembly. In such a configuration of the handle, the pressure-sensitive hand surface lies outside of the grounding element. Only the fingers of the grasping hand lie on the grounding wire which slightly extends over the outer contour of the handle.

In an advantageous embodiment, the metal rail has a contact end which lies elastically against the wire core of the bowden cable in order to establish an electrically conductive connection between the grounding element and the electrical mass. Especially, the metal rail is fixed by clamping at at least three points preferably defining a plane. With the clamping, the assembly complexity is low and the metal rail is spatially reliably fixed via the three clamping points defining a plane so that its elastic characteristics can be used for generating the spring-elastic conducting contact of a contact end against the wire.

BRIEF DESCRIPTION OF THE DRAWINGS

The invention will now be described with reference to the drawings wherein:

FIG. 4 is a schematic showing the interior of a motor housing having two handles; and, FIG. 5 is a section view taken through the handle of FIG. 4 equipped with a grounding element configured as a sheet metal strip.

DESCRIPTION OF THE PREFERRED EMBODIMENTS OF THE INVENTION

Figure 1:
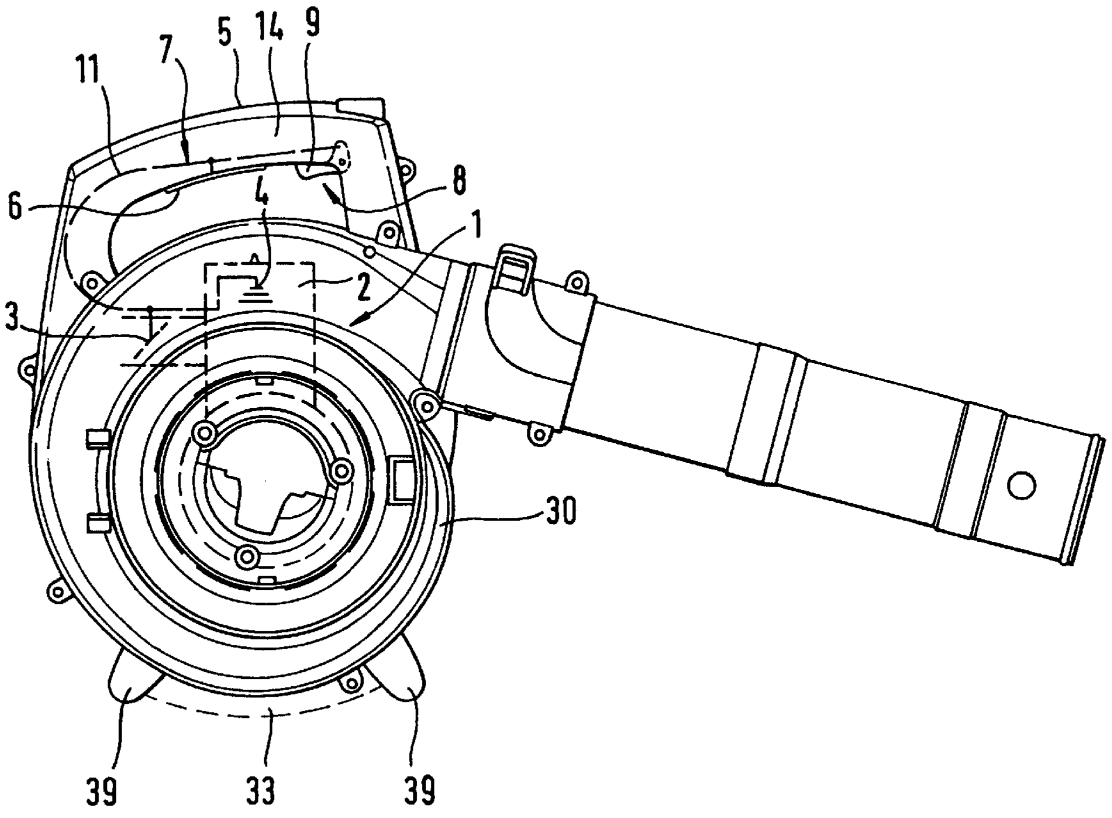
FIG. 1 is a side elevation view of a suction/blower apparatus.

The suction/blower apparatus shown in FIG. 1 includes an internal combustion engine 2 as a drive motor 1. A throttle flap 3 is mounted in the intake channel of the internal combustion engine and is for controlling the power. The throttle flap 3 is electrically conductively connected to the engine block 1 which defines an electrical mass 4. The drive motor 1 can also be an electrical motor.

An actuating element 8 is mounted in the handle 5 manufactured from an electrically insulating material. The actuating element 8 is in the form of a throttle lever 9. The actuating element is connected via a transmitting element 7 to the supporting shaft of the throttle flap. The transmitting element 7 is for actuating the throttle flap via an actuating lever and is configured as a bowden cable 11 in the handle 5. A grounding element 6 is mounted on the surface of the handle 5. The grounding element 6 is conductively connected to the electrical ground 4 via the transmitting element 7 and the throttle flap 3. The handle 5 includes two injection-molded half shells 14 manufactured of plastic.

Figure 2:
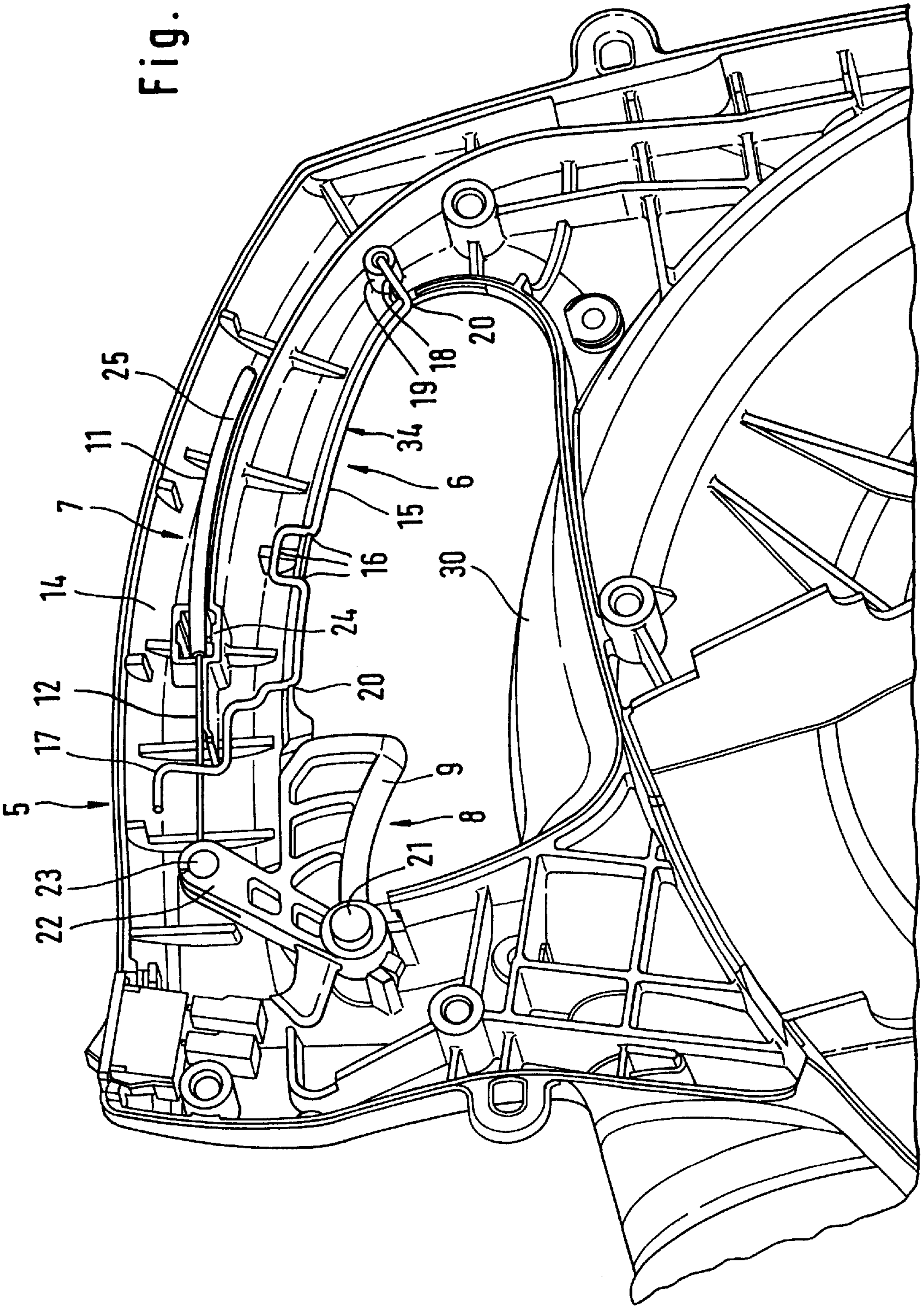
FIG. 2 is a detail view taken through the handle of the work apparatus of FIG. 1 shown in a perspective view and having a grounding element connected to a bowden cable.

FIG. 2 shows one of the two half shells 14 in a perspective view. The half shells 14 define the handle 5. The actuating element 8 in the form of a throttle lever 9 is pivotally journaled about a bearing lug 21 in the handle 5 and is operatively connected to the throttle flap 3 (FIG. 1) via transmitting element 7, namely, the bowden cable 11.

To provide a better overview, only the throttle lever end of the bowden cable 11 is shown, whose bowden cable sleeve or casing 25 is held in a bowden cable support 24 within the half shells 14. The core of the bowden cable 11 is configured as a wire 12 and has a lug 23 at the throttle lever end. The lug 23 is hooked into the pull lever 22 of the throttle lever 9.

The wire 12 is electrically conductive and is conductively connected to the electric ground 4 (FIG. 1). The grounding element 6 is mounted on the side of the handle 5, which faces toward the motor housing 30. The grounding element 6 can be sheet metal, a metal or carbon fiber filled plastic part or the like. In the embodiment shown, the grounding element 6 is an elongated metal rail 34 and is configured as a grounding wire 15 with a contact end 17. The contact end 17 lies laterally elastically and resiliently against the wire 12 of the Bowden cable 11, that is, the bowden cable wire 12 is subjected to force by the contact end 17 transversely to its longitudinal axis.

The grounding wire 15 is fixed by clamping between the two plastic shells 14 but can also be held by using threaded fasteners or by welding. The position of the grounding wire 15 is so pregiven by the partition plane of the two plastic shells 14 that it lies on the side of the handle 5 facing toward the internal combustion engine 2. The partition plane can, however, also be so arranged that the grounding wire is fixed laterally of the handle 5. Three clamping points 16 define a plane whereby the grounding wire 15 is securely fixed spatially. Additionally, the grounding wire is held at two further clamping points 20. Furthermore, the grounding wire 15 includes a fixing end 18 by means of which the grounding wire 15 is fixed form-tight on the handle 5. For this purpose, the fixing end 18 is bent over at an angle and is held in a fixing lug 19 which is formed by injection molding. The fixing lug 19 as well as the clamping points 16 and 20 can be separate components. In the embodiment shown, these clamping points are formed as a single piece with the half shell 14.

Figure 3:
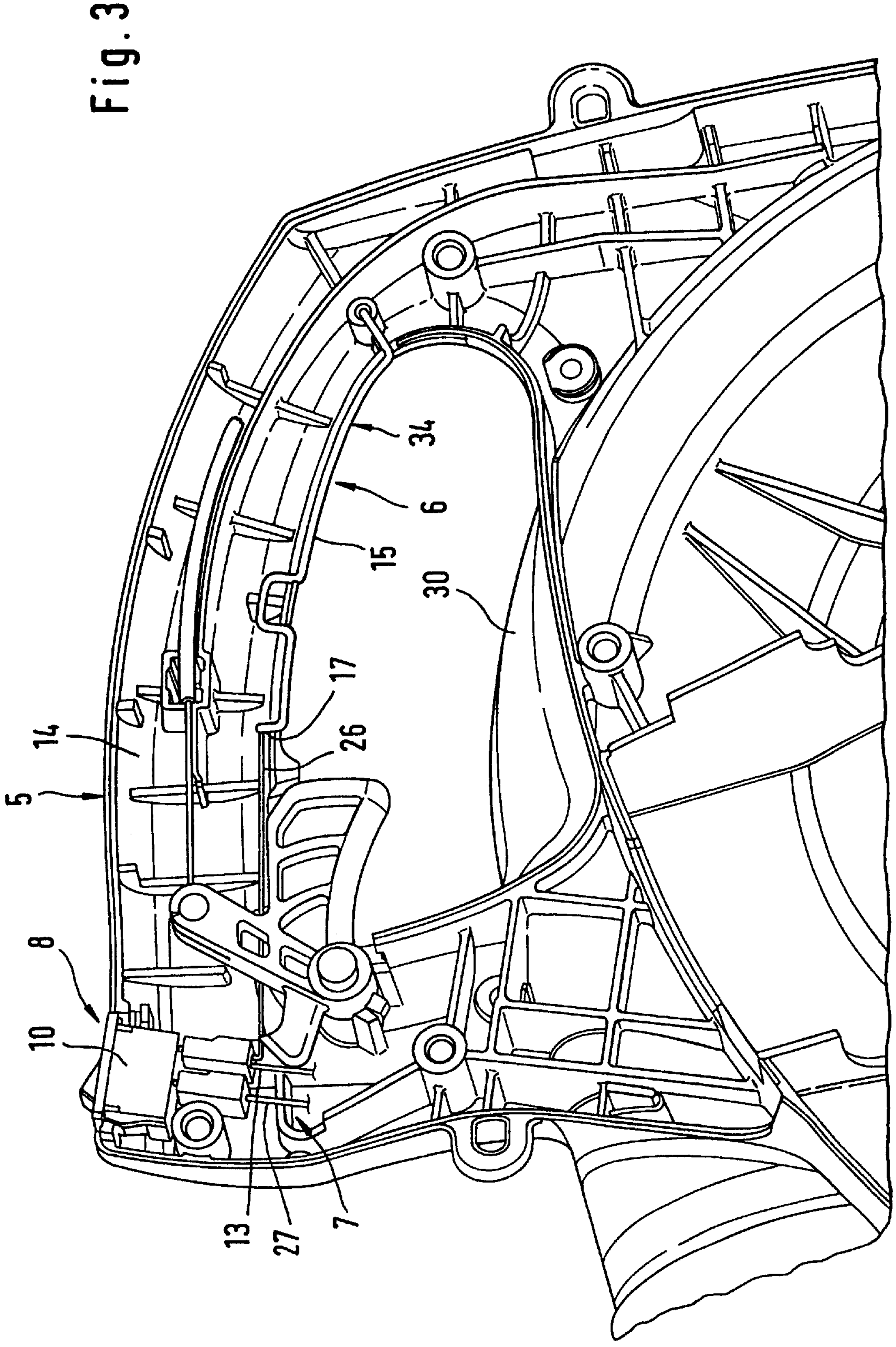
FIG. 3 is a detail view of the handle of FIG. 2 equipped with a grounding element connected to an ignition switch.

In the embodiment of the handle 5 shown in FIG. 3, an ignition switch 10 is provided as an actuating element 8. The ground cable 13 of the ignition switch 10 is operatively connected to the engine block 1 in the sense of a transmitting element 7. The ignition switch 10 includes an ignition line 27 and a ground cable 13. The ignition line 27 is conductively connected to a voltage, which generates the ignition spark, and the ground cable 13 to the electrical ground 4 (FIG. 1). The ignition voltage of the electric ignition circuit of the engine 2 is switched via the ignition switch 10 to ground via the ground cable 13 thereby switching off the engine 2. The grounding element 6 is configured as a grounding wire 15 and is electrically conductively connected via a ground line 26, which is attached at the contact end 17, to the ground cable 13 and therefore to the electrical ground 4 (FIG. 1) of the engine block 1.

The grounding wire 15 can also be connected directly to the electrical ground of the engine.

FIG. 4 shows the interior of an opened engine housing 30 having a shell construction. The housing 30 includes a center part 42 having an end face intake opening 40. The center part 42 has an approximately cylindrical shape. A blow-out opening 41 is provided on the peripheral end of the center part 42. Two handles (5, 33) are provided on the periphery on two opposite-lying sides of the center part 42. The two handles (5, 33) are provided for holding the work apparatus in desired directions. A throttle lever 9 is provided on the handle 5 and a grounding element 6 is provided on the handle 33. The grounding element 6 is in the form of an elongated metal rail 34. The metal rail 34 includes a contact end 17 and is connected at this end to the electrical ground 4 via a grounding line 26. The metal rail 34 is arranged laterally of the handle 33. A support foot 39 for setting down the work apparatus is provided on both ends of the handle 33.

The handle 33 is made of full material or of plastic shells 14 and, as shown in FIG. 5, has two openings 32. The metal rail 34 is fixed in the two openings 32 in the region of the bent-over portions 35 provided at the ends of the metal rail. A snap hook 38 is provided in the region of the bent-over portion 35 and extends through the opening 32 and engages behind the handle wall. On the end of the metal rail 34, which lies opposite the snap hook 38, a hook 37 is provided in the region of the bent-over portion 35 and this hook engages behind a holding wall 36 provided on the handle 33. The metal rail 34 can be configured as a grounding wire 15 and is a sheet metal strip 31 in the embodiment shown.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

said grounding element being an elongated metal rail;

said handle having two openings;

said elongated metal rail having bent-over portions at respective ends thereof fixed in corresponding ones of said openings; and, one of said bent-over portions including a snap hook and the other one of said bent-over portions including a hook engaging behind a wall of said handle.

2. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

a housing for accommodating said drive motor therein;

said handle having a side facing toward said housing; and, said grounding element being mounted on said side of said handle.

3. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

said handle including two half shells joined to form said handle;

said half shells conjointly defining at least three clamping points spaced one from the other; and, said grounding element being fixed by clamping at said three clamping points.

4. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

an actuator element accommodated on said handle;

said drive motor having an actuator member;

a transmitting member connecting said actuator element on said handle to said actuator member;

said drive motor being an internal combustion engine; and, said actuator element being a throttle lever and said actuator member being a throttle flap of said engine.

5. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

an actuator element accommodated on said handle;

said drive motor having an actuator member;

a transmitting member connecting said actuator element on said handle to said actuator member;

said electrically conducting means including said transmitting member; and, said transmitting member being connected to said electric ground.

6. A portable handheld work apparatus comprising:

a drive motor having an electric ground;

a handle operatively connected to said drive motor;

said handle being made of electrically insulating material and having a surface;

a grounding element mounted in said surface;

means for electrically connecting said grounding element to said electric ground;

said drive motor being a spark-ignition engine;

an ignition switch having a ground cable; and, said grounding element being connected to said ground cable for interrupting the ignition.

7. The portable handheld work apparatus of claim 1, wherein said handle has a longitudinal direction and said metal rail extends in said longitudinal direction; said metal rail having a contact end; and, said electrical connecting means connecting said contact end to said electric ground.

8. The portable handheld work apparatus of claim 1, wherein said handle comprises two half shells made of plastic and joined to form said handle.

9. The portable handheld work apparatus of claim 1, further comprising a housing for accommodating said drive motor therein; said handle having a side facing toward said housing; and, said grounding element being mounted on said side of said handle.

10. The portable handheld work apparatus of claim 1, wherein said handle comprises two half shells joined to form said handle; said half shells conjointly defining at least three clamping points spaced one from the other; and, said grounding element being fixed by clamping at said three clamping points.

11. The portable handheld work apparatus of claim 1, wherein said elongated metal rail is a sheet metal strip.

12. The portable handheld work apparatus of claim 1, wherein said elongated metal rail is a ground wire.

13. The portable handheld work apparatus of claim 1, further comprising an actuator element accommodated on said handle; said drive motor having an actuator member; and, a transmitting member connecting said actuator element on said handle to said actuator member.

14. The portable handheld work apparatus of claim 13, wherein said drive motor is an internal combustion engine; and, said actuator element is a throttle lever and said actuator member being a throttle flap of said engine.

15. The portable handheld work apparatus of claim 1, wherein said handle is a first handle and said apparatus further comprising a second handle mounted so as to lie opposite said first handle; and, said grounding element being mounted on said second handle.

16. The portable handheld work apparatus of claim 13, wherein said electrically conducting means includes said transmitting member; and, said transmitting member being connected to said electric ground.

17. The portable handheld work apparatus of claim 16, wherein said transmitting member is a bowden cable; and, said bowden cable having an electrically conducting wire and said grounding element having a contact end resiliently biased against said wire.

18. The portable handheld work apparatus of claim 1, wherein said drive motor is a spark-ignition engine; and, said apparatus further comprising: an ignition switch having a ground cable; and, said grounding element being connected to said ground cable for interrupting the ignition.

19. The portable handheld work apparatus of claim 2, wherein said grounding element is an elongated metal rail.

20. The portable handheld work apparatus of claim 19, wherein said handle has a longitudinal direction and said metal rail extends in said longitudinal direction; said metal rail having a contact end; and, said electrical connecting means connecting said contact end to said electric ground.

21. The portable handheld work apparatus of claim 19, wherein said handle comprises two half shells made of plastic and joined to form said handle.

22. The portable handheld work apparatus of claim 19, wherein said handle has two openings; said elongated metal rail having bent-over portions at respective ends thereof fixed in corresponding ones of said openings; and, one of said bent-over portions including a snap hook and the other one of said bent-over portions including a hook engaging behind a wall of said handle.

23. The portable handheld work apparatus of claim 2, wherein said handle comprises two half shells joined to form said handle; said half shells conjointly defining at least three clamping points spaced one from the other; and, said grounding element being fixed by clamping at said three clamping points.

24. The portable handheld work apparatus of claim 19, wherein said elongated metal rail is a sheet metal strip.

25. The portable handheld work apparatus of claim 19, wherein said elongated metal rail is a ground wire.

26. The portable handheld work apparatus of claim 2, further comprising an actuator element accommodated on said handle; said drive motor having an actuator member; and, a transmitting member connecting said actuator element on said handle to said actuator member.

27. The portable handheld work apparatus of claim 26, wherein said drive motor is an internal combustion engine; and, said actuator element is a throttle lever and said actuator member being a throttle flap of said engine.

28. The portable handheld work apparatus of claim 2, wherein said handle is a first handle and said apparatus further comprising a second handle mounted so as to lie opposite said first handle; and, said grounding element being mounted on said second handle.

29. The portable handheld work apparatus of claim 26, wherein said electrically conducting means includes said transmitting member; and, said transmitting member being connected to said electric ground.

30. The portable handheld work apparatus of claim 29, wherein said transmitting member is a bowden cable; and, said bowden cable having an electrically conducting wire and said grounding element having a contact end resiliently biased against said wire.

31. The portable handheld work apparatus of claim 2, wherein said drive motor is a spark-ignition engine; and, said apparatus further comprising: an ignition switch having a ground cable; and, said grounding element being connected to said ground cable for interrupting the ignition.

32. The portable handheld work apparatus of claim 3, wherein said grounding element is an elongated metal rail.

33. The portable handheld work apparatus of claim 32, wherein said handle has a longitudinal direction and said metal rail extends in said longitudinal direction; said metal rail having a contact end; and, said electrical connecting means connecting said contact end to said electric ground.

34. The portable handheld work apparatus of claim 32, wherein said handle comprises two half shells made of plastic and joined to form said handle.

35. The portable handheld work apparatus of claim 32, wherein said handle has two openings; said elongated metal rail having bent-over portions at respective ends thereof fixed in corresponding ones of said openings; and, one of said bent-over portions including a snap hook and the other one of said bent-over portions including a hook engaging behind a wall of said handle.

36. The portable handheld work apparatus of claim 3, further comprising a housing for accommodating said drive motor therein; said handle having a side facing toward said housing; and, said grounding element being mounted on said side of said handle.

37. The portable handheld work apparatus of claim 32, wherein said elongated metal rail is a sheet metal strip.

38. The portable handheld work apparatus of claim 32, wherein said elongated metal rail is a ground wire.

39. The portable handheld work apparatus of claim 3, further comprising an actuator element accommodated on said handle; said drive motor having an actuator member; and, a transmitting member connecting said actuator element on said handle to said actuator member.

40. The portable handheld work apparatus of claim 39, wherein said drive motor is an internal combustion engine; and, said actuator element is a throttle lever and said actuator member being a throttle flap of said engine.

41. The portable handheld work apparatus of claim 3, wherein said handle is a first handle and said apparatus further comprising a second handle mounted so as to lie opposite said first handle; and, said grounding element being mounted on said second handle.

42. The portable handheld work apparatus of claim 39, wherein said electrically conducting means includes said transmitting member; and, said transmitting member being connected to said electric ground.

43. The portable handheld work apparatus of claim 42, wherein said transmitting member is a bowden cable; and, said bowden cable having an electrically conducting wire and said grounding element having a contact end resiliently biased against said wire.

44. The portable handheld work apparatus of claim 3, wherein said drive motor is a spark-ignition engine; and, said apparatus further comprising: an ignition switch having a ground cable; and, said grounding element being connected to said ground cable for interrupting the ignition.

45. The portable handheld work apparatus of claim 4, wherein said grounding element is an elongated metal rail.

46. The portable handheld work apparatus of claim 45, wherein said handle has a longitudinal direction and said metal rail extends in said longitudinal direction; said metal rail having a contact end; and, said electrical connecting means connecting said contact end to said electric ground.

47. The portable handheld work apparatus of claim 45, wherein said handle comprises two half shells made of plastic and joined to form said handle.

48. The portable handheld work apparatus of claim 45, wherein said handle has two openings; said elongated metal rail having bent-over portions at respective ends thereof fixed in corresponding ones of said openings; and, one of said bent-over portions including a snap hook and the other one of said bent-over portions including a hook engaging behind a wall of said handle.

49. The portable handheld work apparatus of claim 4, further comprising a housing for accommodating said drive motor therein; said handle having a side facing toward said housing; and, said grounding element being mounted on said side of said handle.

50. The portable handheld work apparatus of claim 4, wherein said handle comprises two half shells joined to form said handle; said half shells conjointly defining at least three clamping points spaced one from the other; and, said grounding element being fixed by clamping at said three clamping points.

51. The portable handheld work apparatus of claim 45, wherein said elongated metal rail is a sheet metal strip.

52. The portable handheld work apparatus of claim 45, wherein said elongated metal rail is a ground wire.

53. The portable handheld work apparatus of claim 4, wherein said handle is a first handle and said apparatus further comprising a second handle mounted so as to lie opposite said first handle; and, said grounding element being mounted on said second handle.

54. The portable handheld work apparatus of claim 4, wherein said electrically conducting means includes said transmitting member; and, said transmitting member being connected to said electric ground.

55. The portable handheld work apparatus of claim 54, wherein said transmitting member is a bowden cable; and, said bowden cable having an electrically conducting wire and said grounding element having a contact end resiliently biased against said wire.

56. The portable handheld work apparatus of claim 4, wherein said drive motor is a spark-ignition engine; and, said apparatus further comprising: an ignition switch having a ground cable; and, said grounding element being connected to said ground cable for interrupting the ignition.

57. The portable handheld work apparatus of claim 5, wherein said grounding element is an elongated metal rail.

58. The portable handheld work apparatus of claim 57, wherein said handle has a longitudinal direction and said metal rail extends in said longitudinal direction; said metal rail having a contact end; and, said electrical connecting means connecting said contact end to said electric ground.

59. The portable handheld work apparatus of claim 57, wherein said handle comprises two half shells made of plastic and joined to form said handle.

60. The portable handheld work apparatus of claim 57, wherein said handle has two openings; said elongated metal rail having bent-over portions at respective ends thereof fixed in corresponding ones of said openings; and, one of said bent-over portions including a snap hook and the other one of said bent-over portions including a hook engaging behind a wall of said handle.

61. The portable handheld work apparatus of claim 5, further comprising a housing for accommodating said drive motor therein; said handle having a side facing toward said housing; and, said grounding element being mounted on said side of said handle.

62. The portable handheld work apparatus of claim 5, wherein said handle comprises two half shells joined to form said handle; said half shells conjointly defining at least three clamping points spaced one from the other; and, said grounding element being fixed by clamping at said three clamping points.

63. The portable handheld work apparatus of claim 57, wherein said elongated metal rail is a sheet metal strip.

64. The portable handheld work apparatus of claim 57, wherein said elongated metal rail is a ground wire.

65. The portable handheld work apparatus of claim 5, wherein said drive motor is an internal combustion engine; and, said actuator element is a throttle lever and said actuator member being a throttle flap of said engine.

66. The portable handheld work apparatus of claim 5, wherein said handle is a first handle and said apparatus further comprising a second handle mounted so as to lie opposite said first handle; and, said grounding element being mounted on said second handle.

67. The portable handheld work apparatus of claim 5, wherein said transmitting member is a bowden cable; and, said bowden cable having an electrically conducting wire and said grounding element having a contact end resiliently biased against said wire.

68. The portable handheld work apparatus of claim 5, wherein said drive motor is a spark-ignition engine; and, said apparatus further comprising: an ignition switch having a ground cable; and, said grounding element being connected to said ground cable for interrupting the ignition.

69. The portable handheld work apparatus of claim 6, wherein said grounding element is an elongated metal rail.

70. The portable handheld work apparatus of claim 69, wherein said handle has a longitudinal direction and said metal rail extends in said longitudinal direction; said metal rail having a contact end; and, said electrical connecting means connecting said contact end to said electric ground.

71. The portable handheld work apparatus of claim 69, wherein said handle comprises two half shells made of plastic and joined to form said handle.

72. The portable handheld work apparatus of claim 69, wherein said handle has two openings; said elongated metal rail having bent-over portions at respective ends thereof fixed in corresponding ones of said openings; and, one of said bent-over portions including a snap hook and the other one of said bent-over portions including a hook engaging behind a wall of said handle.

73. The portable handheld work apparatus of claim 6, further comprising a housing for accommodating said drive motor therein; said handle having a side facing toward said housing; and, said grounding element being mounted on said side of said handle.

74. The portable handheld work apparatus of claim 6, wherein said handle comprises two half shells joined to form said handle; said half shells conjointly defining at least three clamping points spaced one from the other; and, said grounding element being fixed by clamping at said three clamping points.

75. The portable handheld work apparatus of claim 69, wherein said elongated metal rail is a sheet metal strip.

76. The portable handheld work apparatus of claim 69, wherein said elongated metal rail is a ground wire.

77. The portable handheld work apparatus of claim 6, further comprising an actuator element accommodated on said handle; said drive motor having an actuator member; and, a transmitting member connecting said actuator element on said handle to said actuator member.

78. The portable handheld work apparatus of claim 77, wherein said drive motor is an internal combustion engine; and, said actuator element is a throttle lever and said actuator member being a throttle flap of said engine.

79. The portable handheld work apparatus of claim 6, wherein said handle is a first handle and said apparatus further comprising a second handle mounted so as to lie opposite said first handle; and, said grounding element being mounted on said second handle.

80. The portable handheld work apparatus of claim 79, wherein said electrically conducting means includes said transmitting member; and, said transmitting member being connected to said electric ground.

81. The portable handheld work apparatus of claim 80, wherein said transmitting member is a bowden cable; and, said bowden cable having an electrically conducting wire and said grounding element having a contact end resiliently biased against said wire.

* * * * *